United States Patent [19]
Momose

[11] Patent Number: 5,311,432
[45] Date of Patent: May 10, 1994

[54] METHOD AND SYSTEM FOR ESTIMATING THE NEUTRAL POINT OF A STEERING WHEEL

[75] Inventor: Nobuo Momose, Okazaki, Japan

[73] Assignee: Mitsubishi Jidosha Kogyo Kabushiki Kaisha, Tokyo, Japan

[21] Appl. No.: 988,703

[22] Filed: Dec. 10, 1992

[30] Foreign Application Priority Data

Dec. 10, 1991 [JP] Japan .................................. 3-325888

[51] Int. Cl.$^5$ ................................................ B62D 5/06
[52] U.S. Cl. .............................. 364/424.05; 180/79.1; 180/140; 180/142
[58] Field of Search ................... 364/424.05; 180/79.1, 180/140–142; 280/91

[56] References Cited

U.S. PATENT DOCUMENTS

| | | | |
|---|---|---|---|
| 4,856,607 | 8/1989 | Sueshige et al. | 180/79.1 |
| 4,999,776 | 3/1991 | Soltis et al. | 364/424.05 |
| 5,018,594 | 5/1991 | Takehashi et al. | 364/424.05 |
| 5,032,996 | 7/1991 | Shiraishi | 364/424.05 |
| 5,065,323 | 11/1991 | Shiraishi et al. | 364/424.05 |
| 5,065,325 | 11/1991 | Takahashi | 180/79.1 |
| 5,121,322 | 6/1992 | Shiraishi et al. | 180/142 |
| 5,122,955 | 6/1992 | Ishikawa et al. | 180/142 |
| 5,203,420 | 4/1993 | Shiraishi | 364/424.05 |

Primary Examiner—Gary Chin

[57] ABSTRACT

A method is provided which permits accurate estimation of the neutral point of a steering wheel while a vehicle is traveling. In this method, a wheel angle is detected whenever a condition, wherein the car speed has reached a specified speed or higher, the working pressure of a hydraulic power steering has not virtually risen yet, and the steering wheel has not yet virtually steered, lasts for a specified time; the detection frequency distribution, which corresponds to the detected wheel angles, is determined; the weighted mean value of the wheel angles is calculated from the detection frequency distribution; and the weighted mean value is estimated as the neutral point of the steering wheel.

40 Claims, 5 Drawing Sheets

METHOD AND SYSTEM FOR ESTIMATING THE NEUTRAL POINT OF A STEERING WHEEL

BACKGROUND OF THE INVENTION

The present invention relates to a method and system for estimating the neutral point of the steering wheel of a vehicle while the vehicle is traveling.

In a vehicle provided with electronic control equipment which is controlled in accordance with a steering condition, the steering wheel, i.e., the steering shaft, is generally equipped with a wheel angle sensor. This wheel angle sensor functions to detect a wheel angle when the steering wheel is steered, for allowing a front-wheel steering angle to be determined from the detected wheel angle.

The steering angle of front wheels provides an important control factor for implementing, for example, rear-wheel steering control or the trace control and the like of a traction control system; therefore, the wheel angle sensor must be capable of detecting the steering angle of front wheels with high accuracy.

The wheel angle sensor is designed to detect a wheel angle when the steering wheel is steered to the right or left from its neutral point, i.e., the front-wheel steering angle. For this reason, a vehicle must be traveling straight ahead whenever the neutral point of the steering wheel is detected through the wheel angle sensor.

If, however, there is an error in the installation of a steering column or a wheel angle sensor, or if a play or the like develops in a steering system extending from the steering wheel to the front wheels as the vehicle is subjected to external forces, then the neutral point of the steering wheel fails to fully coincide with the straight-ahead travel of the vehicle.

Under such circumstances, the front-wheel steering angle detected through the wheel angle sensor becomes inaccurate, making it impossible to carry out optimum rear-wheel steering control or trace control as mentioned above.

As a prior example focusing on such a problem, Japanese Utility Model Applications Laid-Open H2-85675 U.S. Pat. No. 5,018,594, DE3942494, GB2228460) discloses a technology for correcting the neutral point of a wheel angle sensor output on the basis of the output of the wheel angle sensor obtained when the pressure difference between the right and left pressure chambers of a power steering unit is zero.

In an actual vehicle, however, the condition where the zero pressure difference between the right and left pressure chambers of the power steering unit takes place not only at a particular wheel angle but over a certain range of wheel angles. Therefore, the aforesaid method cannot ensure accurate correction of the aforesaid neutral point.

Theoretically, the problem with the above-mentioned prior example can be solved by using a device for accurately detecting whether front wheels are in the straight-ahead travel condition instead of detecting whether the aforementioned pressure difference is zero, however, no such convenient detecting device has been put in practical use.

SUMMARY OF THE INVENTION

The present invention is based on the aforesaid circumstances, and its object is to provide a method and system for estimating the neutral point of a steering wheel, which method is useful for permitting correction of a sensor signal of a wheel angle sensor or implementation of a highly accurate detection of a front-wheel steering angle.

To fulfill the aforesaid object, according to the present invention, a method and system for estimating the neutral position of a steering wheel is provided, which method and system comprise a straight-ahead travel judgment step and means of judging that a vehicle is in a straight ahead travel condition, and a neutral point estimating step of estimating the neutral point of an output of a wheel angle sensor on the basis of an output of the wheel angle sensor obtained under a condition where the aforesaid straight-ahead travel condition of the vehicle is recognized. In the method according to the present invention, the aforesaid straight-ahead travel judgment step and means comprise a first detection step and means of detecting that the aforesaid straight-ahead travel condition has lasted for a specified time, and a second detection step and means of detecting an output of the aforesaid wheel angle sensor at intervals of a specified cycle which is shorter than the aforesaid specified time, until the lapse of the aforesaid specified time is detected. Further, the aforesaid neutral estimating step and means comprise a distribution calculating step and means of determining a detection frequency distribution which corresponds to a series of wheel angles detected in the aforesaid second detection step, and a neutral point deciding step and means of determining the neutral point of a wheel angle sensor output from the aforesaid detection frequency distribution.

According to the control method of the present invention, a series of detected wheel angles are obtained from the outputs of the wheel angle sensor when the straight-ahead travel condition of a vehicle lasts for a specified time, and the neutral point of the wheel angle sensor is output. In turn, the neutral point of the steering wheel is estimated from the detection frequency distribution corresponding to that series of detected wheel angles; therefore, it is possible to accurately determine the neutral point of the steering wheel even if the straight-ahead travel condition of a vehicle can be determined only with a certain degree of accuracy.

Preferably, in the distribution calculating step and means of the neutral point deciding step and means, the detection frequency distribution is determined based on the wheel angle detection frequencies in a plurality of small wheel angle regions obtained by dividing a specified wheel angle region. Further, the neutral point deciding step and means include a weighted means step and means of calculating the weighted mean value of detected wheel angles, as the neutral point of the wheel angle sensor output, from the detection frequency distribution, for thereby making it possible to accurately determine the neutral point of the steering wheel.

In a preferable estimating method according to the present invention, the straight-ahead travel condition can be easily judged by judging the straight-ahead travel condition of a vehicle on when the working pressure of a hydraulic power steering system for assisting the operating physical force of the steering wheel is a specified pressure or less.

According to another preferable estimating method, accurate judgment of the straight-ahead travel condition can be performed by rendering the judgment of the straight-ahead travel condition valid only when it is determined that the car speed is a specified car speed or higher or when no steering speed of a specified value or higher is generated. This permits accurate determination of the neutral point of a steering wheel.

According to still another preferable estimating method, it is made possible to accurately estimate the neutral point with a reduced memory capacity by providing a plurality of arrays for accumulating the values, which indicate wheel angle detection frequencies in a plurality of small wheel angle regions, by determining the detection frequency distribution by adding one to an accumulated value which corresponds to a detected wheel angle of the plurality of arrays each time a wheel angle sensor output is detected, and subtracting one from the accumulated values of all the arrays when there is an array which has a value exceeding a maximum allowable value.

Other characteristics and advantages of the present invention will be made apparent from the description of an embodiment explained in connection with the accompanying drawings.

DETAILED DESCRIPTION FOR THE PREFERRED EMBODIMENTS OF THE PRESENT INVENTION

Figure 1:
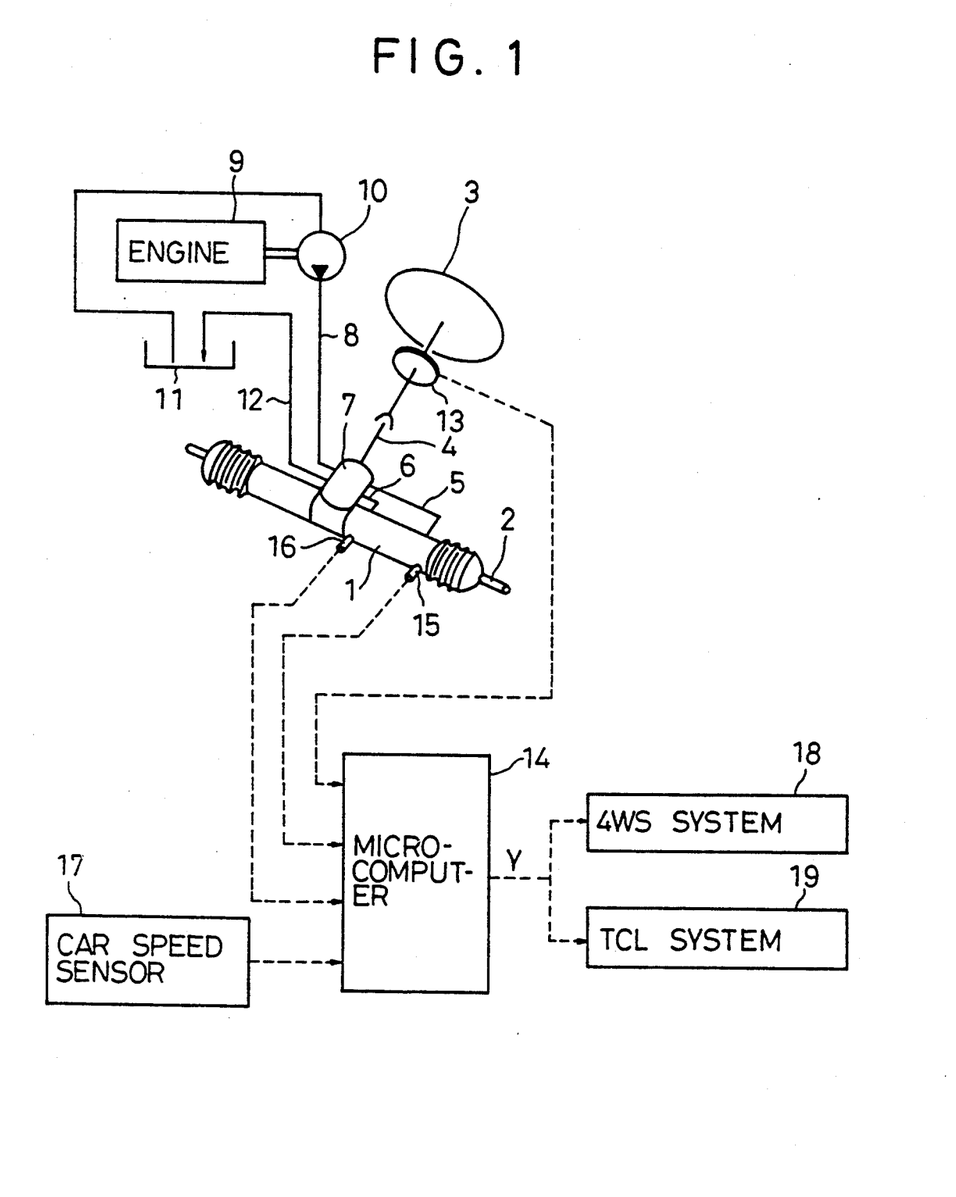
FIG. 1 is a schematic diagram of a steering system for an embodiment of the present invention.

Referring to FIG. 1, a hydraulic power steering system of a vehicle is schematically shown. This hydraulic power steering system is equipped with a power cylinder 1, and both ends of a piston rod 2 in the power cylinder 1 are arranged to be linked to the right and left front wheels although they are not illustrated.

Further, the piston rod 2 and a steering wheel 3, i.e., its steering shaft 4, are interconnected via a rack and a pinion although they are not illustrated. Accordingly, when the steering wheel 3 is steered to the right or left, the piston rod 2 is mechanically driven via the rack and pinion, thus making it possible to drive the front wheels to the right or left.

On the other hand, the power cylinder 1 incorporates a pair of pressure chambers (not shown) formed on both sides of the piston by the piston made integral with the piston rod 2 and the circumferential wall of the power cylinder. These pressure chambers are connected to a control valve 7 of the power steering system via hydraulic lines 5 and 6. A hydraulic supply line 8 extends from the control valve 7 and the hydraulic supply line 8 is connected to a hydraulic reservoir 11 via a hydraulic pump 10 driven by an engine 9. A return line 12 also extends from the control valve 7, and the return line 12 is directly connected to the hydraulic reservoir 11.

When the steering wheel 3 is steered, the aforementioned control valve 7 is operated to supply oil pressure to a pressure chamber, which corresponds to that steering direction for actuating the piston rod 2 by the hydraulic pressure, and thus adds to the steering power of the steering wheel 3. When the steering wheel 3 is not steered, the control valve 7 is in the neutral position, and the hydraulic pressure supplied from the hydraulic pump 10 is immediately returned to the hydraulic reservoir 11 from the control valve 7 via the return line 12; therefore, no pressure difference develops between the right and left pressure chambers of the power cylinder 1.

A wheel angle sensor 13 is mounted on the steering shaft 4, and the wheel angle sensor 13 is electrically connected to a controller, for instance, a one-chip microcomputer 14. In the case of this embodiment, the wheel angle sensor 13 is a digital type sensor using a photo interrupter; therefore, when the steering wheel 3 is steered, the wheel angle sensor 13 detects the wheel angle of the steering wheel 3 with a resolution of 1° and supplies the wheel angle to the microcomputer 14.

The microcomputer 14 incorporates a program for estimating, that is, computing, the neutral point of the steering wheel 3. To implement the program, electrically connected to the microcomputer 14 are pressure sensors 15 and 16 for detecting the pressures in the right and left pressure chambers of the power steering 1, and a car speed sensor 17 for detecting the speed of the vehicle, in addition to the wheel angle sensor 13.

Figure 2:
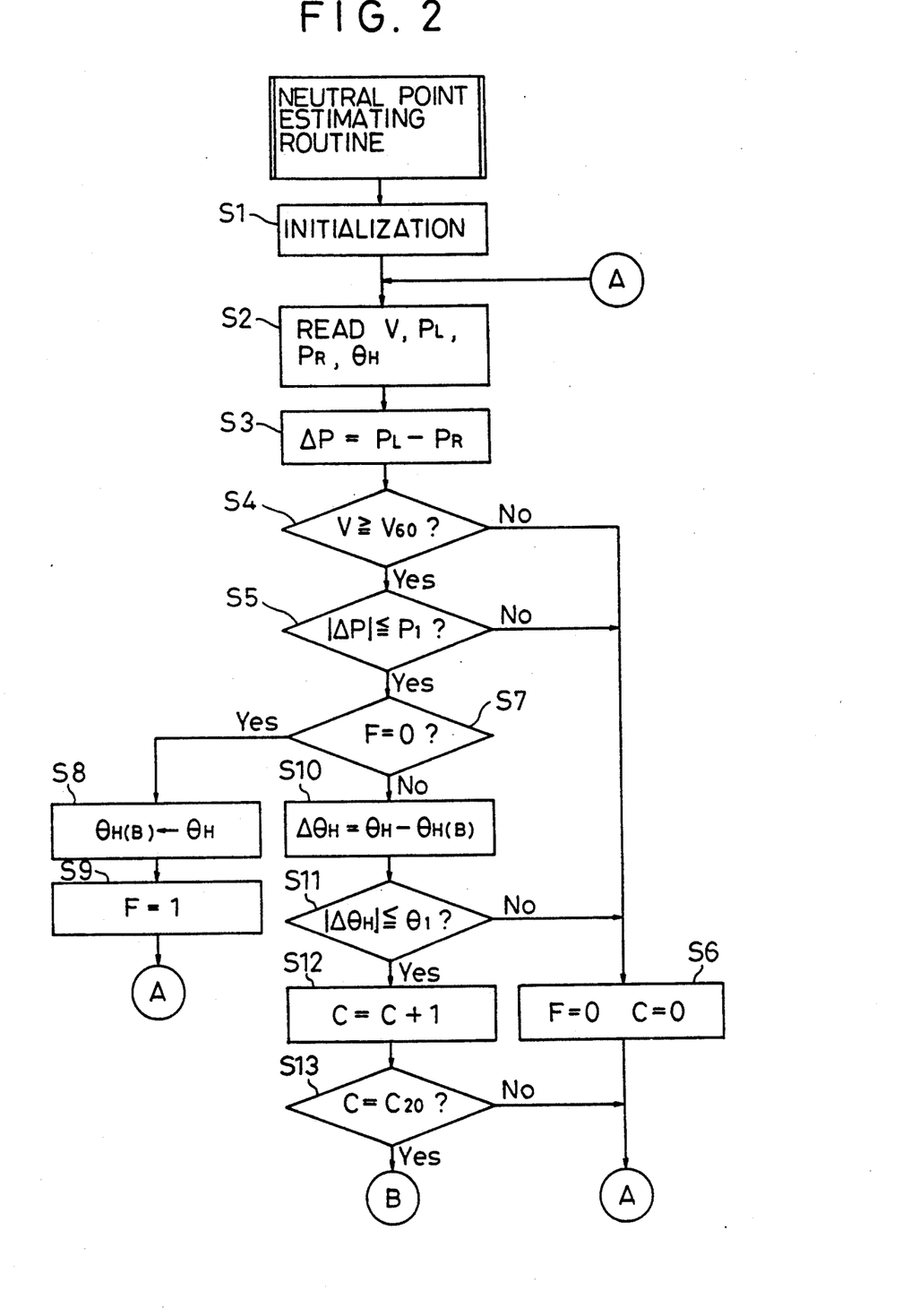
FIG. 2 is a flowchart which shows a part of an estimating routine in a neutral point estimating method for a steering wheel according to an embodiment of the present invention.
Figure 3:
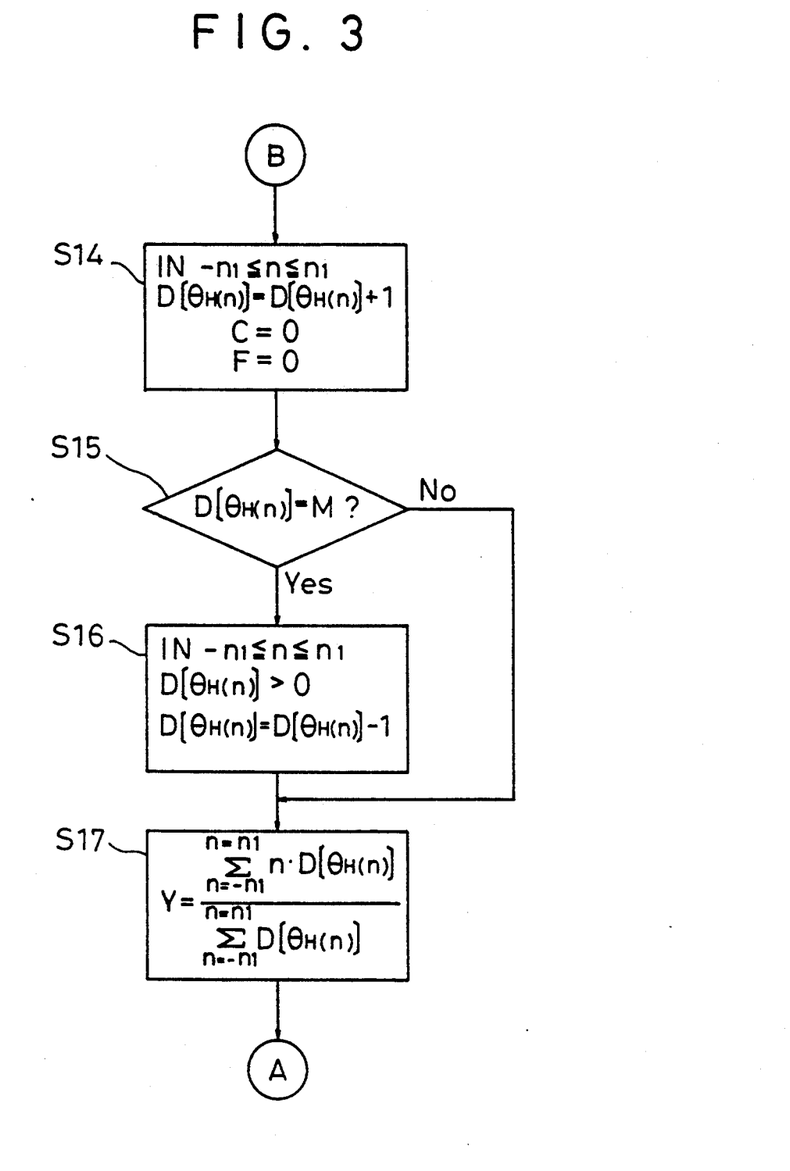
FIG. 3 is a flowchart which shows the rest of the estimating routine which is partly shown in FIG. 2.

Next, referring to FIG. 2 and FIG. 3, a routine for estimating the neutral point of the steering wheel 3, which is carried out by the microcomputer 14, is shown. The following portion provides an explanation for this estimating routine.

The estimating routine is designed to be repeatedly implemented at intervals of 5-msec., for example. First, in a step S1, initialization is performed. During the intialization process, the values of, for example, a counter C, a flag F, and a plurality of arrays D [$\theta H(n)$] for storing wheel angle detection frequencies to be discussed later are all reset to 0.

The arrays D [$\theta H(n)$] are installed, for instance, in a memory of the microcompputer 14, each array consists of a memory area including 8 bits, for example. Each array is related to a corresponding one of a plurality of small wheel angle ranges or regions, which are obtained by dividing a specified wheel angle range or region wherein the wheel angle changes, for instance, from $\theta H(-n1)$ to $\theta H(n1)$, and each array is designed to store a detection frequency of wheel angles that fall into the small wheel angle range concerned. In this embodiment, it is assumed that the wheel angle $\theta H$ detected as a neutral point (wheel neutral angle) "n" of the steering wheel 3 takes a value which falls into a range from $-10°$ to $10°$; therefore, the wheel angles $\theta$ ($-n1$) and $\theta$ (n1) which correspond to the small wheel angle ranges on both ends of the specified wheel angle range, i.e., the minimum wheel neutral angle $-n1$ and the maximum wheel neutral angle n1, are set to $-10°$ and $10°$, respectively. Also, the angle width of the small wheel angle range is set to 1° which is equivalent to the resolution of the wheel angle sensor 13. Accordingly, the specified wheel angle range from $-10°$ to $10°$ is divided into $(2n1+1)$ ranges, namely, 21 small wheel angle ranges.

In the subsequent step S2, a car speed V, pressures PL and PR of the pressure chambers, and a wheel angle $\theta H$ supplied from the aforesaid sensors are read into the microcomputer 14. Then in a step S3, a power steering pressure $\Delta P$ of the power cylinder 1 is calculated.

The power steering pressure $\Delta P$ of the power cylinder 1 is calculated from a difference between the pressure PL and the pressure PR detected through a pair of pressure sensors 15 and 16. The power steering pressure $\Delta P$ is calculated from the formula given below:

$$\Delta P = PL - PR.$$

In the following steps S4 and S5, the system judges in sequence whether the car speed V has exceeded a specified car speed V60 (e.g., 60 km/h) and the absolute value of the power steering pressure $\Delta P$, i.e., $|\Delta P|$, is a specified pressure P1 (e.g., 1 kgf/cm$^2$) or less.

If the judgment result of either the step S4 or S5 is negative (NO), then the system executes a step S6 and goes back to the step S2 to repeat the step S2 and the subsequent steps. In the step S6, the values of the counter C and the flag F are reset to 0.

On the other hand, if the judgment results of both steps S4 and S5 are positive (YES), then the system judges in a step S7 whether the flag F is set to 0. Here, under a condition where the judgment results of both steps S4 and S5 become positive for the first time, the judgment result in the step S7 becomes positive; therefore, the system proceeds to a step S8, stores the wheel angle $\theta H$ at that time as a reference wheel angle $\theta H(B)$, and the system sets 1 in the flag F in a step S9.

Figure 4:
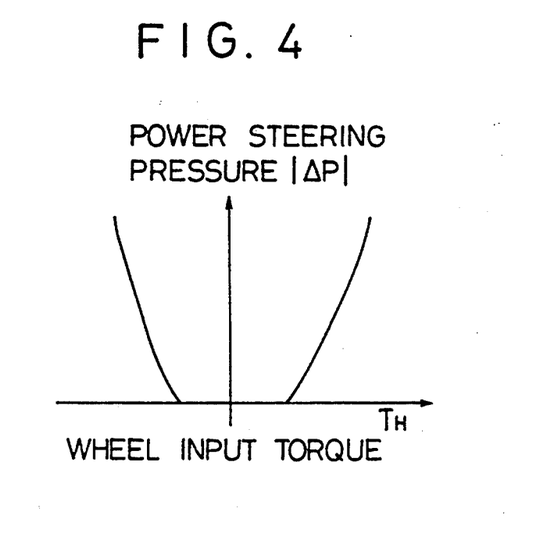
FIG. 4 is a graph which shows the relationship between wheel input torque and power steering pressure.

Specifically, the condition, where the judgment results of both steps S4 and S5 become positive, indicates that the vehicle is traveling at a medium or higher speed, the steering wheel 3 is not steered, that is, the absolute value of a wheel input torque is a specified value or less, and the power steering pressure $\Delta P$ has not virtually risen in the power cylinder 1 as shown in FIG. 4. In other words, this condition indicates that a vehicle is traveling straight ahead.

Figure 5:
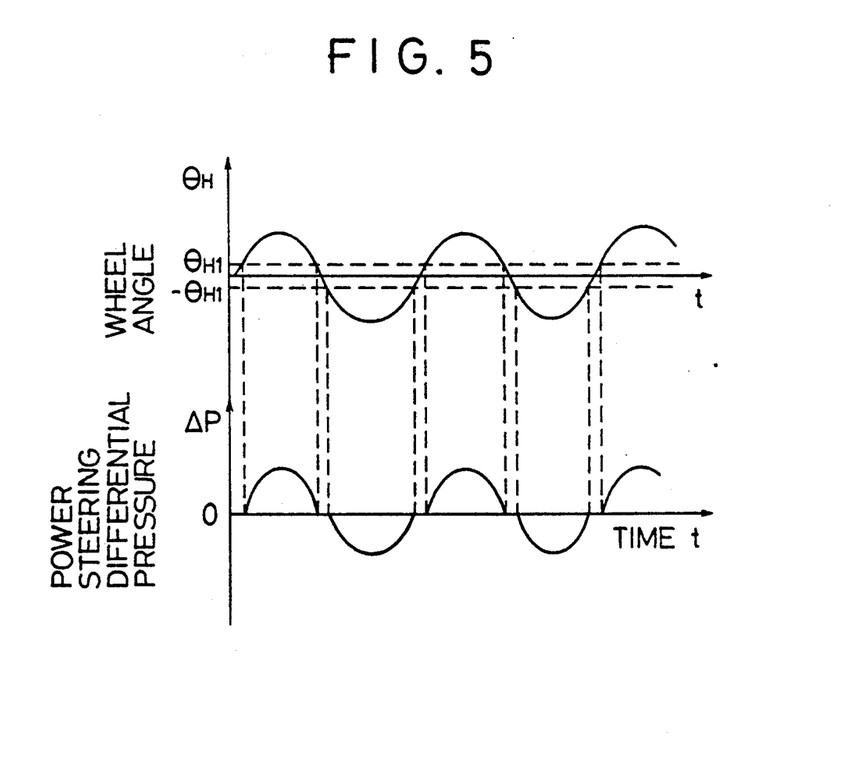
FIG. 5 is a graph which shows changes in power steering pressure caused by changes in wheel angle with the lapse of time.

When the steering wheel 3 is steered to the right or left, the power steering pressure $\Delta P$ that appears in the power cylinder 1 changes as shown in FIG. 5. As is obvious from FIG. 5, the power steering pressure $\Delta P$ does not virtually rise until the steering wheel 3 is steered by a specified wheel angle $|\theta H1|$ or more from its neutral point.

Accordingly, the reference wheel angle $\theta H(B)$ obtained by implementing the step S8 comes to temporarily indicate the neutral point of the steering wheel 3 when the vehicle is traveling straight ahead.

After the step S9 is implemented, the steps following the step S2 are repeated. If the system reaches the step S7 with the judgement results of the steps S4 and S5 being both positive, then the judgment result of the step S7 becomes negative, which causes the next step S10 to be carried out.

In this step S10, the deviation of the wheel angle $\theta H$ from the reference wheel angle $\theta H(B)$, namely, a wheel angle deviation $\Delta \theta H$, is calculated from the following formula:

$$\Delta \theta H = \theta H - \theta H(B).$$

In the next step S11, the system judges whether the absolute value $|\Delta \theta H|$ of the wheel angle deviation $\Delta \theta H$ is a specified angle $\theta 1$ or less (in the case of this embodiment, the specified angle is set, for example, to $\theta 1 = 1°$, in consideration of the detection resolution of the wheel angle sensor 13). If the judgment result is negative, the system goes through the aforesaid step S6 and then repeats the step S2 and the subsequent steps.

On the other hand, if the judgement result of the step S11 is positive, then the value of the counter C is incremented by 1 in a step S12, and it is judged in the next step S13 whether the value of the counter C has reached a specified number C20 (e.g., 20).

If the judgment in the step S13 is carried out immediately after the judgment result of the step S7 becomes positive, then the judgment result will be negative; therefore, the system goes back from the step to the step S2 to repeat the step S2 and the subsequent steps.

On the other hand, if the judgement result of the step S13 is positive, the system proceeds to a step S14 in FIG. 3. The condition, whereunder the step S14 is implemented, indicates a straight-ahead travel condition of a vehicle, wherein the car speed V is V60 or more, the power steering pressure $\Delta P$ of the power cylinder 1 is the specified pressure P1 or less, and the wheel angular velocity is $10°$/sec. or less as is obvious from the judgment results of the steps S4, S5, S11, and S13 as previously mentioned.

More specifically, when it is considered that the estimating routine is repeated every 5 msec. as previously mentioned, to obtain a positive judgment result of the step S13, the wheel angle deviation $\Delta \Theta H$ must be maintained at a specified angle $\theta 1 (= 1°)$ or less during 100 msec; therefore, the wheel angular velocity becomes $10°$/sec. or less. Accordingly, at this time, the steering wheel 3 is not virtually steered.

In the step S14, the wheel angle detection frequency $D[\theta H(n)]$ related to one of the 21 small wheel angle ranges, which were obtained by dividing the specified wheel angle range from $-10°$ to $10°$ by every $1°$, the one to which the wheel angle $\theta H (= \theta H(n))$ read in the step S2 belongs is incremented by 1 to produce the detection frequency distribution shown in the following formula:

$$D[\theta H(n)] = D[\theta H(n)] + 1.$$

Further, in the step S14, the counter C and the flag F are both reset to 0.

In the next step S15, the system judges whether one or more stored values of the 21 memory areas (arrays), which indicate the wheel angle detection frequencies $D[\theta H(n)]$ in the 21 small wheel angle ranges, have reached a maximum permissible value M. The maximum permissible value M is set in accordance with the number of bits constituting the memory area. In this embodiment, the number of bits constituting the memory area is 8, and therefore, $M = 256$.

If the judgment result of the step S15 is negative, then the system proceeds to a step S17, and bypasses a step S16. In the step S17, the weighted mean value Y of the wheel angle $\theta H$ detected as a wheel neutral angle "n" is calculated from the following formula:

$$Y = \Sigma(n \cdot D[\theta H(n)]) / \Sigma D[\theta H(n)].$$

The addition represented by the symbol $\Sigma$ in the above formula is carried out over a range from the minimum value $-n1$ to the maximum value $n1$ with respect to the variable "n" which indicates the small wheel angle range (wheel neutral angle) concerned.

From the step S17, the system goes back to the step S2 of FIG. 2 to repeat the steps following S2.

After that, whenever the aforesaid straight-ahead travel condition of the vehicle lasts for the specified time, the value of the array D [θH(n)], which corresponds to the wheel angle θH(n) detected as the wheel neutral angle "n" at that point, is increased in sequence. Accordingly, the value of the array D [θH(n)] represents the detection frequency of the wheel neutral angle "n;" therefore, the frequency distribution, which corresponds to the wheel neutral angle "n," can be obtained as shown in FIG. 6.

If the judgment result of the step S15 becomes positive, then the step S16 is executed before the step S17 is implemented. In the step S16, the value of each array D [θH(n)] is decremented by 1 provided that the value of the array D [θH(n)] is larger than 0 within a range of $-n1 \leq n \leq n1$.

Figure 6:
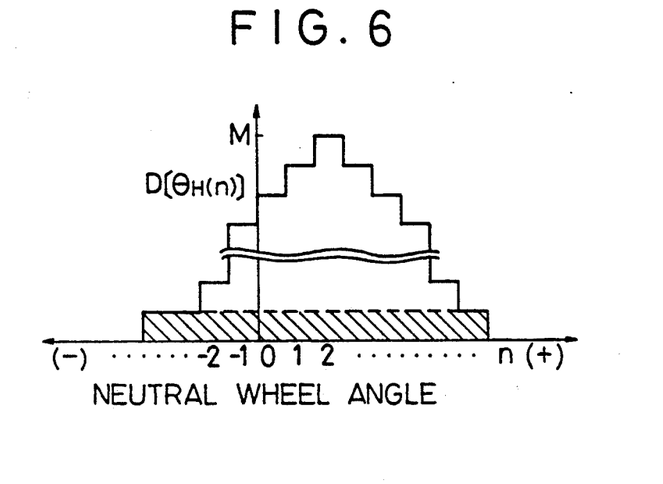
FIG. 6 is a graph which shows a part of the frequency distribution of a wheel neutral angle.
Figure 7:
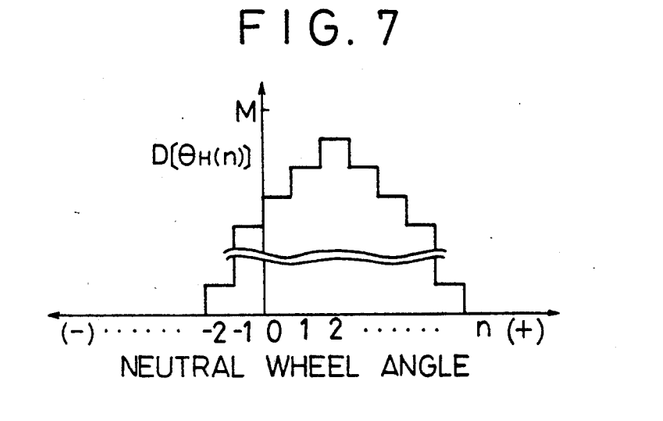
FIG. 7 is a graph which shows a state wherein the frequency distribution of FIG. 6 has been lowered by one level.

More specifically, as shown in FIG. 6, when the value of the array D [θH(2)], which corresponds to n=2, for example, reaches the maximum permissible value M, the value of every D [θH(n)], whose value is 1 or more, is decremented by 1. In other words, the frequency distribution shown in FIG. 6 is rewritten into the frequency distribution shown in FIG. 7 by deleting the hatched part to lower the frequency distribution by one level; therefore, the value of the array D [θH(n)] never exceeds the maximum permissible value M. This makes it possible to decrease the capacity of the memory for holding the value of the array D [θH(n)] to a minimum, which is optimum for the microcomputer 14 mounted on a vehicle.

Figure 8:
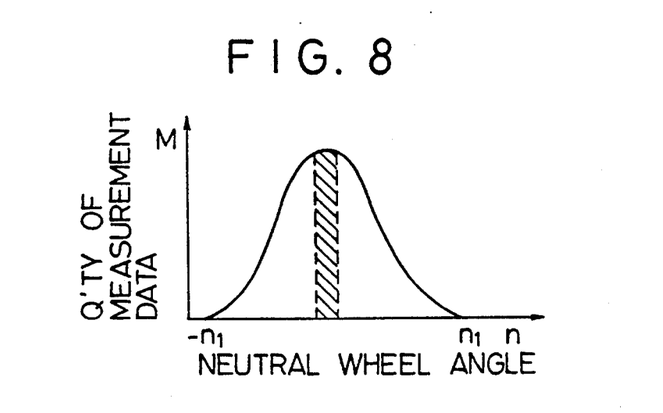
FIG. 8 is a graph which schematically shows the whole frequency distribution of the wheel neutral angles.

As the aforesaid estimating routine is repeatedly implemented, data whose quantity is in the order of hundreds of pieces, regarding the wheel neutral angle "n" of the steering wheel 3, can be accumulated in a memory which is limited in capacity. Thus, as a whole, the detection frequency distribution of the wheel neutral angle "n" will be as shown in FIG. 8. Accordingly, the weighted mean value Y calculated in the aforesaid step S17 accurately indicates the neutral point of the steering wheel 3 and the neutral point of the output of the wheel angle sensor 13 at which the vehicle is kept in the straight-ahead travel condition.

The weighted mean value Y, i.e., the neutral point of the steering wheel 3, is supplied from the microcomputer 14 to a 4-wheel steering system (4 WS system) 18 or a traction control system (TCL system) 19 as shown in FIG. 1 each time the neutral point is calculated through the estimating routine, and the neutral point is used in these systems to correct the wheel angle θH detected through the wheel angle sensor 13. Thus, in the 4 WS system 18 or the TCL system 19, it is possible to carry out rear-wheel steering control or trace control using the accurate wheel angle θH, thereby allowing optimum control to be performed.

The present invention is not limited to the embodiments described above but various modifications thereof may be made. For instance, the values of V60, P1, θ1, and M are just examples and therefore they are not limited to those values. Further, the neutral point of the steering wheel estimated from the weighted mean value Y can be of course applied to diverse control systems, which are based on wheel angles, other than the 4 WS system and the TLC system. In addition, to decide the neutral point of the steering wheel easily, the wheel angle of the maximum detection frequency may be decided as the neutral point of the steering wheel without calculating the weighted mean value Y.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for estimating a neutral point of a steering wheel for a vehicle comprising the steps of:
   (a) determining whether the vehicle is in a straight ahead travel condition, including the sub-steps of,
      (a)(1) detecting whether the determination of said straight ahead travel condition has lasted for a specified time at said step (a), and
      (a)(2) detecting an output of a wheel angle sensor at intervals of a specified cycle, shorter than said specified time, until an elapse of said specified time is detected; and
   (b) estimating said neutral point of said steering wheel based on said output of said wheel angle sensor when said straight ahead travel condition of the vehicle is determined in said step (a), said step (b) including the sub-steps of,
      (b)(1) determining a detection frequency distribution, corresponding to a series of wheel angles detected in said sub-step (a)(2), and
      (b)(2) determining said neutral point of said steering wheel from said detection frequency distribution.

2. The method according to claim 1, wherein said sub-step (b)(2) includes the sub-step of:
   (b)(2)(a) calculating a weighted mean value of said series of wheel angles detected in said sub-step (a)(2), as said neutral point of said steering wheel, from said detection frequency distribution.

3. The method according to claim 1, wherein said sub-step (b)(1) includes the sub-step of:
   (b)(1)(a) determining said detection frequency distribution based on a plurality of wheel angle detection frequencies in a plurality of small wheel angle regions obtained by dividing a specified wheel angle region.

4. The method according to claim 1, wherein said step (a) further includes the sub-step of:
   (a)(3) recognizing that a working pressure of a hydraulic power steering unit for assisting an operating physical force of the steering wheel is no more than a specified pressure level to determine said straight-ahead travel condition.

5. The method according to claim 4, wherein said working pressure is determined from a difference between a first and a second output of a first and a second pressure sensor installed in a right and a left pressure chamber of said hydraulic power steering unit.

6. The method according to claim 4, wherein said step (a) further includes the sub-step of:
   (a)(4) determining whether said straight ahead travel condition is valid only when a car speed is judged to be at least a specified car speed value.

7. The method according to claim 6, wherein said step (a) further includes the sub-step of:
   (a)(5) determining that said straight ahead travel condition is valid only when the steering wheel is maintained in a straight-ahead position.

8. The method according to claim 7, wherein said step (a) for determining whether the steering wheel is in the straight-ahead travel condition is further conditional upon whether a steering speed exceeds a specified value within said specified time.

9. The method according to claim 8, wherein said step (a) for determining whether the steering wheel is in the straight ahead travel condition further includes the sub-step of:
- (a)(3) setting a detected wheel angle, which is obtained when said neutral position of said steering wheel is determined for a first time, as a reference wheel angle, and determining that said neutral position of said steering wheel is valid only when a deviation between a wheel angle detected subsequently and said reference wheel angle is no more than a specified wheel angle value.

10. The method according to claim 3, wherein said sub-step (b)(1) further includes the sub-steps of:
- (b)(1)(b) providing a plurality of arrays for accumulating values representing said plurality of wheel angle detection frequencies in said plurality of small wheel angle regions, and
- (b)(1)(c) adding one to an accumulated value of one of said arrays which corresponds to a detected wheel angle from among said plurality of arrays each time said wheel angle sensor output is detected.

11. The method according to claim 10, wherein a range value of said specified wheel angle region is provided and a resolution value of said wheel angle sensor is provided.

12. The method according to claim 10, wherein said sub-step (b)(1) further includes the sub-step of:
- (b)(1)(d) subtracting one from the accumulated values for each of said plurality of arrays when one of said plurality of arrays has a value which exceeds a maximum permissible value.

13. The method according to claim 12, wherein said sub-step of subtracting is implemented only for each of said plurality of arrays which have values greater than zero.

14. A system for estimating a neutral point of a steering wheel of a vehicle, comprising:
- straight ahead travel determining means for determining whether the vehicle is in a straight ahead travel condition;
- first detecting means for detecting whether said straight ahead travel condition determined by said straight ahead travel determining means has lasted for a specified time;
- second detecting means for detecting an output of a wheel angle sensor at intervals of a specific cycle, shorter than said specified time, until an elapse of said specified time is detected;
- neutral point estimating means for estimating said neutral point of said steering wheel based on said output of said wheel angle sensor when said straight ahead travel condition of the vehicle is determined by said straight ahead travel determining means;
- distribution calculating means for determining a detection frequency distribution corresponding to a series of wheel angles detected by said second detecting means; and
- neutral point deciding means for determining said neutral point of said steering wheel from said detection frequency distribution.

15. The system according to claim 14, further comprising weighted mean value calculating means for calculating a weighted mean value of said series of wheel angles detected by said second detecting means as said neutral point of said steering wheel from said detection frequency distribution.

16. The system according to claim 14, wherein said distribution calculating means determines said detection frequency distribution based on a plurality of wheel angle detection frequencies in a plurality of small wheel angle regions.

17. The system according to claim 14, wherein said straight ahead travel determining means determines said straight ahead travel condition by recognizing that a working pressure of a hydraulic power steering unit for assisting an operating physical force of the steering wheel is no more than a specified pressure level.

18. The system according to claim 17, further comprising a first and a second pressure sensor installed in a right and a left pressure chamber of said hydraulic power steering unit having a first and a second output so that said working pressure is determined from a difference between said first and said second outputs.

19. The system of claim 14, further comprising car speed judging means for determining whether said straight ahead travel condition is valid only when a car speed is at least a specified car speed value.

20. The system of claim 14, further comprising non-steering judging means for determining that said straight ahead travel condition is valid only when the steering wheel is maintained in a straight-ahead position.

21. The system of claim 20, wherein said non-steering judging means determines that a steering speed exceeds a specified value within said specified time.

22. The system of claim 21, wherein said non-steering judging means includes reference value setting means for setting a detected wheel angle, obtained when said neutral position of said steering wheel is determined for a first time, as a reference wheel angle, and deviation judging means for determining whether said neutral position of said steering wheel is valid only when a deviation between a wheel angle detected subsequently and said reference wheel angle is no more than a specified wheel angle.

23. The system according to claim 16, further comprises a plurality of arrays for accumulating values representing said plurality of wheel angle detection frequencies in said plurality of small wheel angle regions and an adder for adding one to an accumulated value of one of said plurality of arrays which corresponds to a detected wheel angle from among said plurality of arrays each time said wheel angle sensor output is detected.

24. The system according to claim 22, wherein a range value for each of said plurality of small wheel angle regions is provided and a resolution value of said wheel angle sensor is provided.

25. The system according to claim 23, further comprising a subtracter for subtracting one from the accumulated values for each of said arrays when one of said arrays has a value which exceeds a maximum permissible value.

26. The system according to claim 25, wherein said subtracter is implemented only for said arrays which have values larger than zero.

27. A method for estimating a neutral point of a steering wheel for a vehicle comprising the steps of:

(a) determining whether a vehicle angular velocity is at least a predetermined rate;

(b) determining whether the vehicle has been in a straight-ahead travel condition at a straight-ahead wheel angle for a predetermined length of time;

(c) incrementing by a predetermined unit value, an element of a wheel angle detection array corresponding to the straight-ahead wheel angle, to form a detection frequency distribution;

(d) decrementing by the predetermined unit value, each element of the wheel angle detection array having a count of at least the predetermined unit value if a current straight-ahead wheel angle count has exceeded a predetermined maximum value; and (e) estimating the neutral point of the steering wheel by calculating a weighted mean value of the detection frequency distribution.

28. The method of claim 27, wherein said steps (a)-(e) are repeatedly implemented at a predetermined interval.

29. The method of claim 27, wherein said steps (a)-(e) are performed by a microcomputer.

30. The method of claim 29, wherein the wheel angle detection array is stored in a memory of the microcomputer and each element of the wheel angle detection array is assigned a memory space equal to the predetermined maximum value.

31. The method of claim 27, wherein each element of the wheel angle detection array corresponds to one of a plurality of straight-ahead wheel angle regions, each having a predetermined angle region width based upon a resolution of a wheel angle sensor, and the plurality of straight-ahead wheel angle regions are within a maximum straight-ahead wheel angle range for the straight-ahead travel condition.

32. The method of claim 27, wherein said step (b) includes the sub-steps of:

(b)(1) detecting a first straight-ahead wheel angle as a reference wheel angle, (b)(2) determining a wheel angle difference between the reference wheel angle and a subsequent straight-ahead wheel angle, (b)(3) determining that the vehicle is travelling straight-ahead if the wheel angle difference is less than a predetermined angle difference, and (b)(4) determining that the straight-ahead travel condition has been attained by repeating the sub-steps (b)(1)-(b)(3) until it is determined that the vehicle has been travelling straight-ahead at the predetermined rate for a predetermined minimum consecutive number of times.

33. The method of claim 27, wherein the straight-ahead wheel angle is determined from a pressure difference of a first and a second output of a left and a right pressure sensor installed in a left and a right pressure chamber of a hydraulic power steering unit, and the straight-ahead travel condition is conditional upon the pressure difference being less than a predetermined pressure value.

34. A system for estimating a neutral point of a steering wheel for a vehicle comprising:

a vehicle velocity sensor for determining whether a vehicle angular velocity is at least a predetermined rate;

straight-ahead travel determining means for determining whether said vehicle has been in a straight-ahead travel condition at a straight-ahead wheel angle for a predetermined length of time;

detection frequency distribution determining means for determining a detection frequency distribution;

estimating means for estimating the neutral point of said steering wheel by calculating a weighted mean value of the detection frequency distribution.

35. The system of claim 34, wherein said straight-ahead travel determining means, said detection frequency distribution determining means and said estimating means are implemented by a microcomputer.

36. The system of claim 34, wherein said straight-ahead travel determining means determines whether said vehicle has been in the straight-ahead travel condition by detecting a first straight-ahead wheel angle as a reference wheel angle, determining a wheel angle difference between the reference wheel angle and a subsequent straight-ahead wheel angle, determining that said vehicle is travelling straight-ahead if the wheel angle difference is less than a predetermined angle difference, and determining that the straight-ahead travel condition has been attained if said vehicle has been travelling straight-ahead at the predetermined rate for a predetermined minimum consecutive number of times.

37. The system of claim 34, wherein said straight-ahead travel determining means determines the straight-ahead wheel angle from a pressure difference of a first and a second output of a left and a right pressure sensor installed in a left and a right pressure chamber of a hydraulic power steering unit, and the straight-ahead travel condition is conditional upon the pressure difference being less than a predetermined pressure value.

38. The system of claim 34, wherein said detection frequency distribution determining means determines the detection frequency distribution by incrementing by a predetermined unit value, an element of a wheel angle detection array corresponding to the straigh-ahead wheel angle, to form said detection frequency distribution, and by decrementing by the predetermined unit value, each element of the wheel angle detection array having a count of at least the predetermined unit value if the current straight-ahead wheel angle count has exceeded a predetermined maximum value.

39. The system of claim 38, wherein each of the wheel angle detection array elements corresponds to one of a plurality of straight-ahead wheel angle regions, each having a predetermined angle region width based upon a resolution of a wheel angle sensor, and the plurality of straight-ahead wheel angle regions are within a maximum straight-ahead wheel angle range for the straight-ahead travel condition.

40. The system of claim 38, wherein the wheel angle detection array is stored in a memory of a microcomputer and each element of the wheel angle detection array is assigned a memory space equal to the predetermined maximum value.

* * * * *